(12) United States Patent
Kamiya et al.

(10) Patent No.: US 7,462,953 B2
(45) Date of Patent: Dec. 9, 2008

(54) CONTROL SYSTEM FOR ENGINE STARTING

(75) Inventors: Hodaka Kamiya, Obu (JP); Noriaki Terashima, Okazaki (JP)

(73) Assignee: DENSO CORPORATION, Kariya (JP)

( * ) Notice: Subject to any disclaimer, the term of this patent is extended or adjusted under 35 U.S.C. 154(b) by 295 days.

(21) Appl. No.: 11/251,817

(22) Filed: Oct. 18, 2005

(65) Prior Publication Data

US 2006/0091729 A1 May 4, 2006

(30) Foreign Application Priority Data

Oct. 28, 2004 (JP) .............................. 2004-314550

(51) Int. Cl.
*B60R 25/04* (2006.01)
*H01H 27/00* (2006.01)
(52) U.S. Cl. ..................................... 307/10.3
(58) Field of Classification Search ................. 307/10.3
See application file for complete search history.

(56) References Cited

U.S. PATENT DOCUMENTS 5,796,179 A 8/1998 Honaga 6,705,422 B2 * 3/2004 Maekawa .................... 180/444

FOREIGN PATENT DOCUMENTS

JP A-H08-133016 5/1996

* cited by examiner

*Primary Examiner*—Michael J Sherry
*Assistant Examiner*—Dru M Parries
(74) *Attorney, Agent, or Firm*—Posz Law Group, PLC (57) ABSTRACT

Prenotification information of releasing prohibition of an engine operation is stored in an EEPROM in an interval. The interval is after that a lock controller commands a steering lock to be operable. The interval is before that an engine controller switches an engine operation prohibiting signal to be in a prohibition releasing condition. The engine operation prohibiting signal may change from the prohibition releasing condition to the prohibition setting condition after an engine starting controller starts an engine. In this condition, the engine is stopped, or is continuously operated in accordance with the prenotifying information stored in the EEPROM.

15 Claims, 6 Drawing Sheets

(1) ENGINE STARTING REQUEST SIGNAL (3) RELEASE REQUEST SIGNAL

NONVOLATILE MEMORY

(4) UNLOCK COMPLETION SIGNAL (5) ENGINE OPERATION PROHIBITING SIGNAL (6) IG (IG2)

(7) STARTER STARTING REQUEST SIGNAL

ENGINE ROTATION SPEED

FIG. 8

(1) ENGINE STARTING REQUEST SIGNAL (3) RELEASE REQUEST SIGNAL

NONVOLATILE MEMORY

(4) UNLOCK COMPLETION SIGNAL (5) ENGINE OPERATION PROHIBITING SIGNAL (6) IG (IG2)

(7) STARTER STARTING REQUEST SIGNAL

ENGINE ROTATION SPEED

CONTROL SYSTEM FOR ENGINE STARTING

CROSS REFERENCE TO RELATED APPLICATIONS

This application is based on and incorporates herein by reference Japanese Patent Application No. 2004-314550 filed on Oct. 28, 2004.

FIELD OF THE INVENTION

The present invention relates to a control system for starting an engine.

BACKGROUND OF THE INVENTION

A control system (engine starting control system) for starting an engine is disclosed in JP-A-8-133016, for example. The control system is used as an immobilizer for protecting a vehicle from being stolen. Specifically, a verification ID is stored in a key or a wireless communication portable device taken by a user of the vehicle. The immobilizer authenticates the verification ID of the portable device with respect to the master ID of the vehicle, so that engine starting is allowed in accordance with a verification result between the ID of the portable device and the master ID of the vehicle.

In this engine starting control system, when an ID verification is rejected, an engine controller becomes in a starting prohibiting condition (immobilizer set condition), so that engine starting is prohibited by an unauthorized person. Here, the vehicle has an immobilizer controller, which is a component different from the engine controller. The immobilizer controller transmits a control command for prohibiting engine from being started. The engine controller controls engine starting in reference to a prohibition setting signal, which prohibits engine starting, and a prohibition releasing signal, which releases the starting prohibiting condition, transmitted from the immobilizer controller.

When the immobilizer controller releases the starting prohibiting condition, the engine controller accepts a starting operation performed by a driver, so that the engine controller starts the engine. However, when a cranking is performed in engine starting, a starter imposes a heavy load against a battery, and battery voltage temporarily largely decreases. As a result, the immobilizer controller may be reset, and a verification result of ID is also reset, in general. The prohibition setting signal, which is once released, may be reset to be the prohibition setting condition. In this condition, the engine controller may stop the engine, and engine starting may not be smoothly performed.

The following two methods may be conceivable to solve the above problem.

First, a routine for releasing the prohibition setting condition is reexecuted after returning to a step, in which the ID verification is performed.

Second, a data backup is performed to store information, which indicates completion of releasing the prohibition setting condition, in a non-volatile memory after completing the processing for releasing the prohibition setting condition to enable recognizing the releasing of the prohibition setting condition, even after resetting.

However, in recent years, complexity of an algorithm of the ID verification increases for enhancement of security. Accordingly in the first method, the ID reverification may take long, and engine restarting may not be smoothly performed due to the ID reverification.

When the engine starting control system adopts a mechanical key system, the key position is fixed during operation of the vehicle, and an ID can be transmitted from a transponder of the key inserted into a key cylinder, so that transmittance of the ID can be regularly retried, for example. However, in recent years, the engine starting control system adopts a method using a wireless communication from a wireless communication portable device to perform ID verification. In this system, the portable device is not necessarily located near a receiver on the side of the vehicle for the ID verification, after a driver enters into the vehicle. Accordingly, in this system, it may be impossible to perform ID reverification.

By contrast, in the second method, the releasing of the prohibition setting condition may be recognized by referring the back up data in the non-volatile memory without performing ID reverification, thereby proving the problem in the first method. However, a period before engine starting after releasing the prohibition setting condition is short, in general. Therefore, the immobilizer controller may be reset due to cranking before performing the data backup of the releasing of the prohibition setting condition in the non-volatile memory. In this case, it is impossible to recognize the releasing of the prohibition setting condition in accordance with the back up data.

SUMMARY OF THE INVENTION

In view of the foregoing and other problems, it is an object of the present invention to produce a control system for starting an engine, the control system being capable of performing engine start smoothly on a steady basis.

According to one aspect of the present invention, A control system for starting an engine includes a user ID verifying means, a device control means, a device command means, an operation prohibiting means, a control command means, a starting control means, and a prenotification storage portion, and a continuation control means. The user ID verifying means verifies a user ID stored in a security key of a user. The device control means switches a specific device to be one of operatable and non-operatable. The device command means transmits a lock releasing signal to the device control means to set the specific device operatable when the user ID verifying means authenticates the user ID. The operation prohibiting means outputs an operation prohibiting signal, which can be switched between a prohibition setting condition and a prohibition releasing condition. The control command means switches the operation prohibiting signal to be in the prohibition releasing condition after the specific device changes to be operatable. The starting control means starts the engine when the operation prohibiting signal is in the prohibition releasing condition. The starting control means prohibits starting the engine when the operation prohibiting signal is in the prohibition setting condition. The prenotification storage portion stores prenotifying information of releasing prohibition of the engine operation in an interval. The interval is subsequent to that the device command means commands the specific device to be operatable. The interval is in advance of that the control command means switches the operation prohibiting signal to be in the prohibition releasing condition. The continuation control means controls stopping the engine and continuing the engine operation in accordance with information stored in the prenotification storage portion when the operation prohibiting signal changes from the prohibition releasing condition to be in the prohibition setting condition after the starting control means starts the engine.

In the above system, the prenotification storage portion stores prenotifying information that indicates releasing prohibition of the engine operation in the interval subsequent to that the device command means commands the specific device to be operatable. The continuation control means continues the engine operation when the prenotifying information is stored in the prenotification storage portion after the starting control means starts the engine. Even when the operation prohibiting signal irregularly changes from the prohibition releasing condition to be in the prohibition setting condition due to decrease in battery voltage caused by cranking or the like in engine starting, the engine can be restricted from accidentally stopping, for example.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 1:
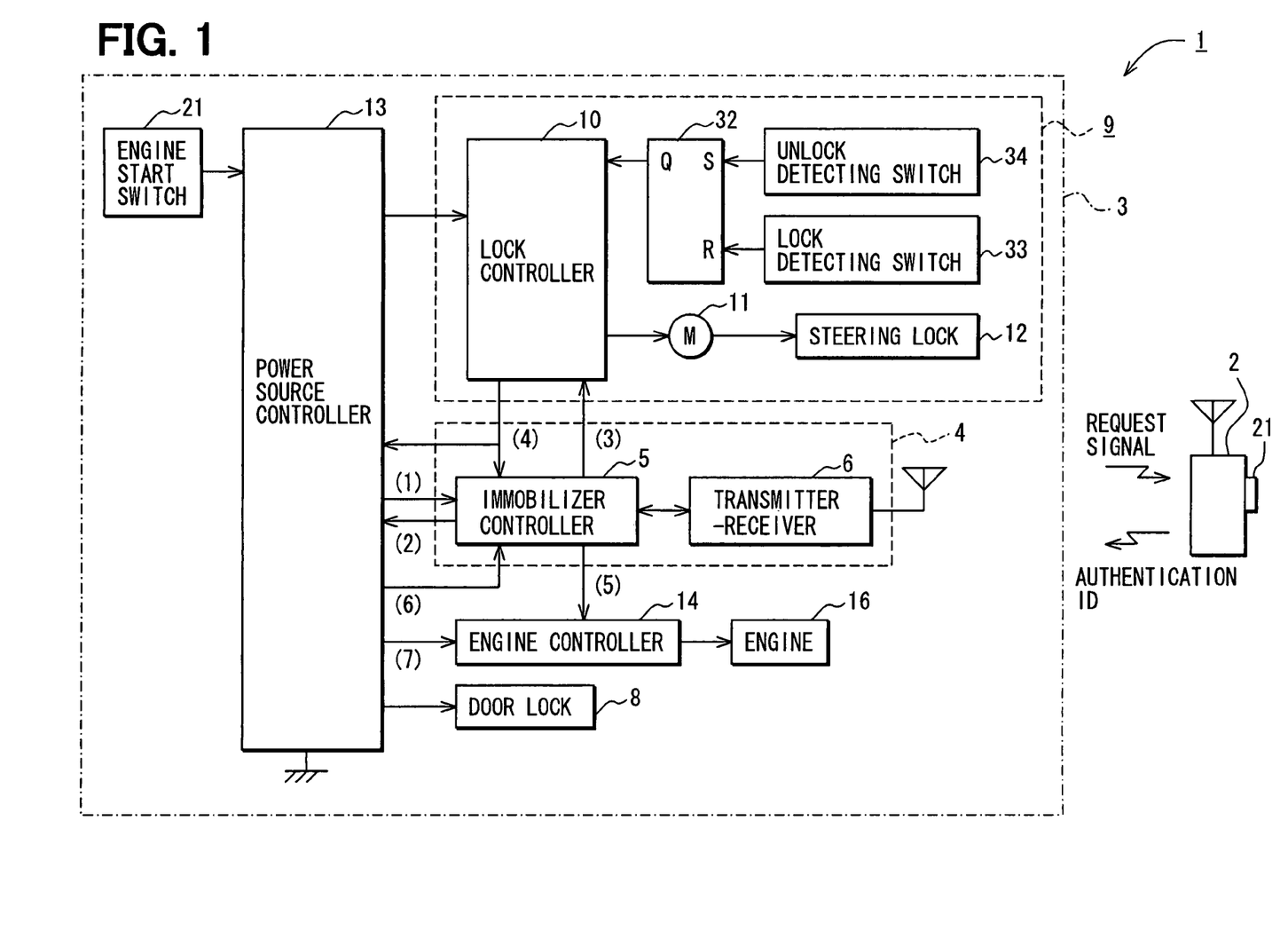
FIG. 1 is a block diagram showing an example of an engine starting control system according to an embodiment of the present invention.
Figure 3:
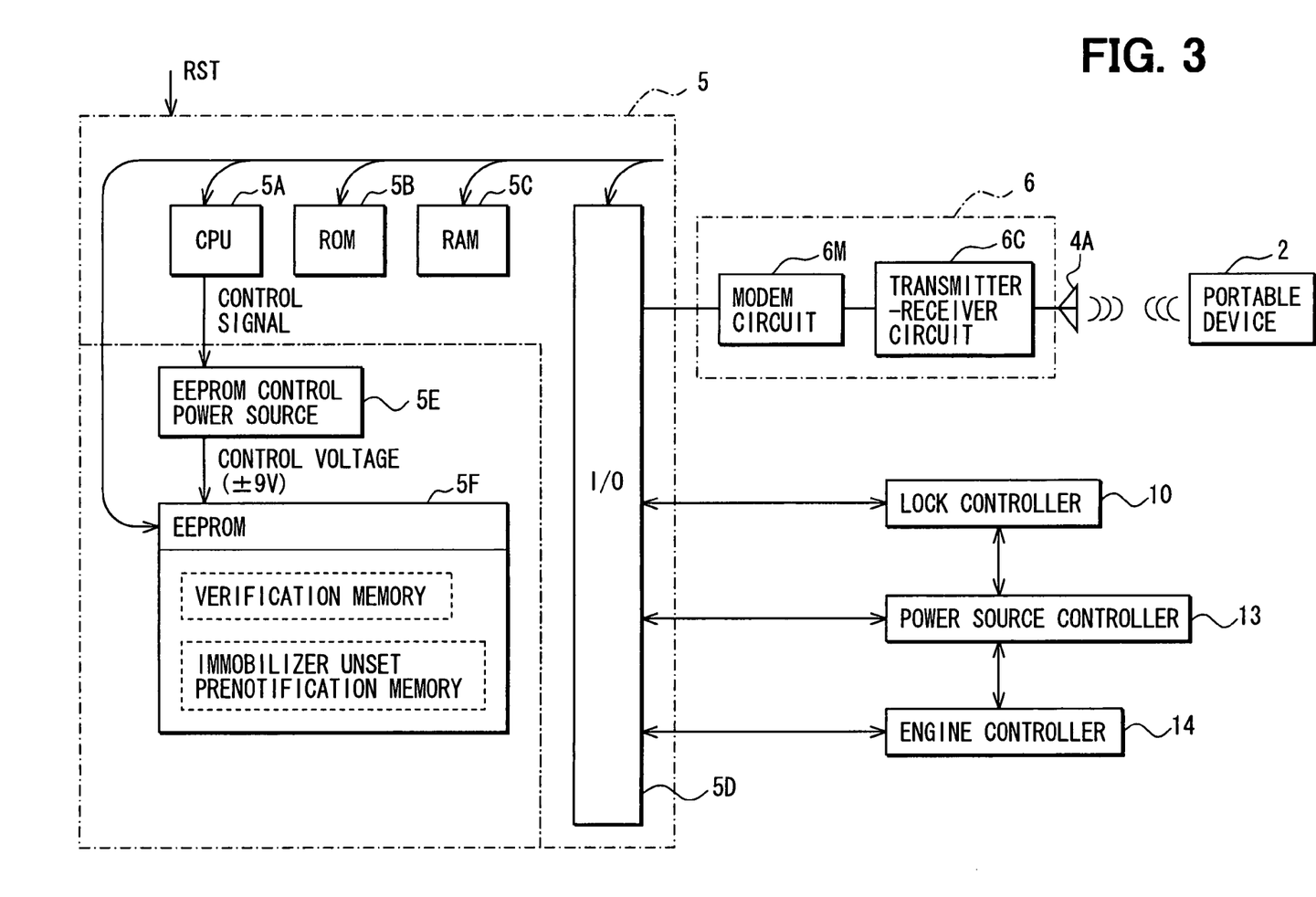
FIG. 3 is a block diagram showing an immobilizer controller according to an embodiment.

As shown in FIG. 1, an engine starting control system 1 includes a wireless communicating portable device (wireless device, smart key, security key) 1 and a controller 4. The wireless device 1 is a mobile device, which can be freely taken by a driver (user). The controller 4 is provided in a vehicle 3. The controller 4 includes an immobilizer controller 5 and a transmitter-receiver 6. As shown in FIG. 3, the transmitter-receiver 6 is constructed of a transmitter-receiver circuit 6C and a modem circuit 6M. As referred to FIG. 1, the immobilizer controller 5 intermittently output a request signal to the outside of the vehicle via the transmitter-receiver 6. When the wireless device 2 is in a predetermined region in the vehicle, and the wireless device 2 receives the request signal, the wireless device 2 automatically transmits a verification ID of the wireless device 2 to the vehicle 3 in a wireless manner. The vehicle 3 has an engine controller 14. The engine controller 14 is electrically connected with a power source controller 13. The engine controller 14 controls fuel injection and ignition of the engine 16.

The vehicle 3 has a steering lock mechanism 9. The steering lock mechanism 9 includes a lock controller 10, a steering lock motor 11 and a steering lock 12. The steering lock motor 11 serves as an actuator.

Figure 2:
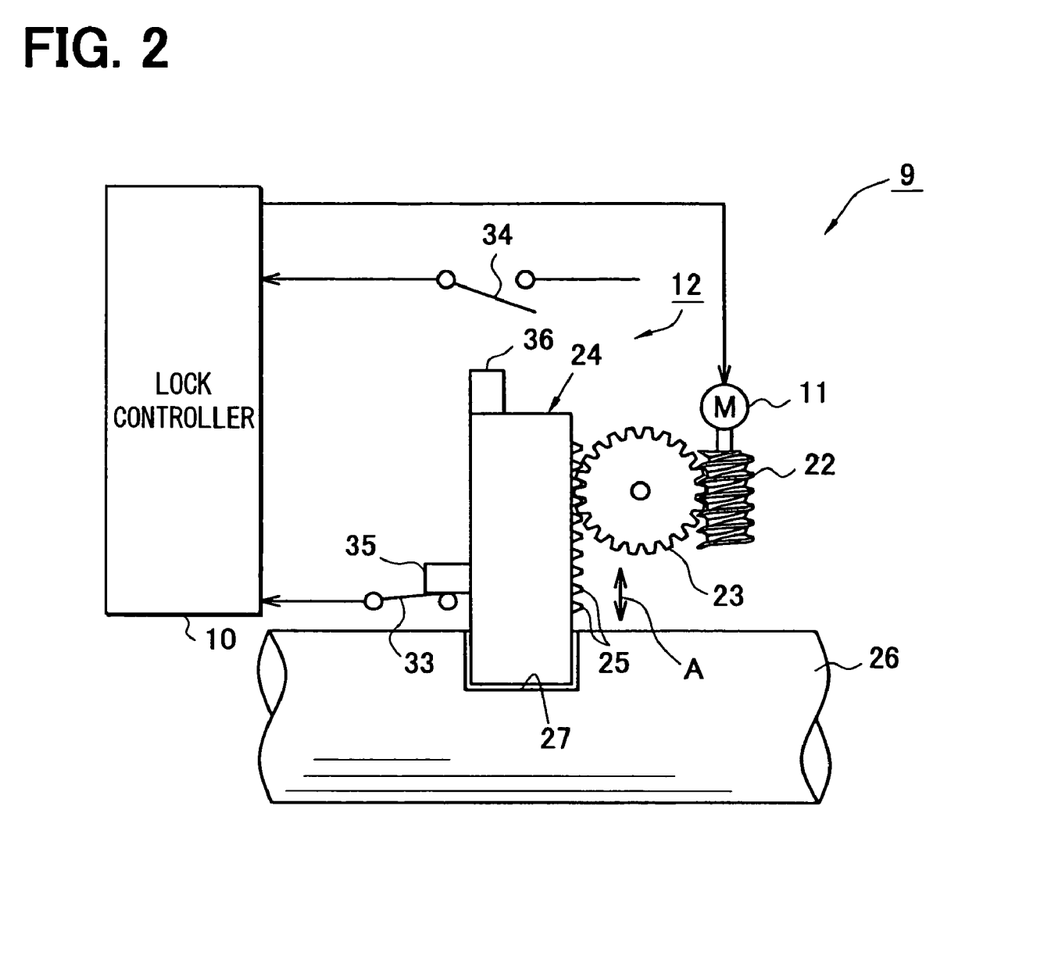
FIG. 2 is a schematic diagram showing a steering lock mechanism of the engine starting control system according to the embodiment.

As shown in FIG. 2, the steering lock motor 11 has an output shaft, to which a worm gear 22 is connected. The worm gear 22 is geared with a gear portion 25 of a lock pin (lock bar) 24 via a spur gear 23. The lock pin 24 serves as a hooking means. The steering lock motor 11 is operated, so that the lock pin 24 moves in the direction shown by the arrow A in FIG. 2. The steering lock motor 11 moves the lock pin 24, so that the tip end of the lock pin 24 is engageable with a recess 27 of a steering shaft 26.

When the steering lock motor 11 rotates in the forward direction, for example, the lock pin 24 is inserted into the recess 27 of the steering shaft 26, so that the steering lock 12 becomes in a lock condition, and the steering shaft 26 is restricted from rotating. By contrast, when the steering lock motor 11 rotates in the reverse direction, for example, the lock pin 24 is pulled out of the recess 27, so that the steering lock 12 becomes in an unlock condition, and the steering shaft 26 becomes rotatable.

The steering lock mechanism 9 includes a lock detecting switch 33 and an unlock detecting switch 34. Each switch 33, 34 is constructed of a mechanical switch such as a limit switch. The lock detecting switch 33 detects the lock condition of the steering lock 12. The unlock detecting switch 34 detects the unlock condition of the steering lock 12. When the steering lock 12 becomes in the lock condition, a contact portion 35 on one side of the lock pin 24 makes contact with the lock detecting switch 33, so that the lock detecting switch 33 is turned ON. The lock detecting switch 33 outputs an ON signal to the lock controller 10. By contrast, when the steering lock 12 becomes in the unlock condition, a contact portion 36 on the other side of the lock pin 24 makes contact with the unlock detecting switch 34, so that the unlock detecting switch 34 is turned ON.

An identifying signal indicating the lock condition and the unlock condition is input to the lock controller 10 as a level signal. The unlock condition corresponds to an active condition of the level signal, and the lock condition corresponds to an inactive condition of the level signal, for example. In this embodiment, both the output signals of the lock detecting switch 33 and the unlock detecting switch 34 are active when being turned ON, and are inactive when being turned OFF. For example, both the output signals of the lock detecting switch 33 and the unlock detecting switch 34 become high level when being turned ON, and become low level (grounded) when being turned OFF.

As referred to FIG. 1, a latch circuitry 32 has a set terminal and a reset terminal. The set terminal of the latch circuitry 32 is connected with the output signal of the unlock detecting switch 34, and the reset terminal of the latch circuitry 32 is connected with the output signal of the lock detecting switch 33, such that the identifying signal is locked by a resetting operation. Thus, the output signal of the latch circuitry 32 is used as the identifying signal indicating the lock condition and the unlock condition. Specifically, the unlock condition is not identified before the lock pin 24 is completely removed from the steering shaft 26 and the lock pin 24 biases the unlock detecting switch 34.

The immobilizer controller 5, the lock controller 10, the power source controller 13, and the engine controller 14 are constructed of a computer hardware. The computer hardware includes a CPU, a ROM, a RAM, and an input/output device (I/O port) which are connected with each other via a bus, for example, so that the components of the computer hardware are connected with each other via a network.

As referred to FIG. 3, the immobilizer controller 5 has a computer 5 including a CPU 5A, a ROM 5B, a RAM 5C, and an input/output device (I/O port) 5D, which are connected with each other via a bus. The bus of the computer 5 is further connected with an EEPROM 5F, which is a nonvolatile memory, for example. The EEPROM 5F has a verification memory and an immobilizer unset prenotification memory. A master ID for authentication is stored in the verification memory. The immobilizer unset prenotification memory serves as an engine operation prohibition releasing prenotifying information storing portion.

The EEPROM 5F is operated by read drive voltage when data is read from the EEPROM 5F, and is operated by write drive voltage when data is stored in the EEPROM 5F. The write drive voltage is set higher than the read drive voltage. For example, the write drive voltage is set at 9V, and the read drive voltage is set at 5V. An EEPROM control power source 5E is a power source including a booster circuit for reading data from the EEPROM 5F and for writing data in the EEPROM 5F. When the computer constructing the immobilizer controller 5 receives a reset signal RST from the outside of the immobilizer controller 5, the computer of the immobilizer controller 5 resets data stored in the RAM 5C, and initializes signals respectively output from signal ports of the I/O port 5D.

Next, components of the engine starting control system 1 are described.

The immobilizer controller 5 serves as a user ID verifying means that verifies a user ID stored in the security key (wireless device) 2 taken by the user.

The lock controller 10 serves as a specific vehicular operating device control means (device control means) that switches a specific vehicular operating device (specific device) to one of an operatable condition and a non-operatable condition. The specific device is needed for driving the vehicle by the user.

The power source controller 13 serves as a specific vehicular operating device control command means (device command means) that commands the device control means to set the specific device in the operatable condition when a verification result signal (2) obtained by the user ID verifying means is an acceptable verification.

The immobilizer controller 5 serves as an engine operation prohibiting signal output means (operation prohibiting means) that outputs an engine operation prohibiting signal (operation prohibiting signal, 5) to switch between a prohibition setting output condition (prohibition setting condition) and a prohibition releasing output condition (prohibition releasing condition). The engine operation of the vehicle is prohibited in the prohibition setting output condition. The engine operation of the vehicle is allowed in the prohibition releasing output condition.

The immobilizer controller 5 further serves as a control command means that switches the engine operation prohibiting signal (5) to be in the prohibition releasing output condition after moving the specific device to be in the operatable condition. This transition of the specific device is identified in accordance with an unlock completion signal (4).

The engine controller 14 serves as an engine starting control means (starting control means) that starts the engine when the engine operation prohibiting signal (5) is in the prohibition releasing output condition, and prohibits the engine starting when the engine operation prohibiting signal (5) is in the prohibition setting output condition.

Figure 7:
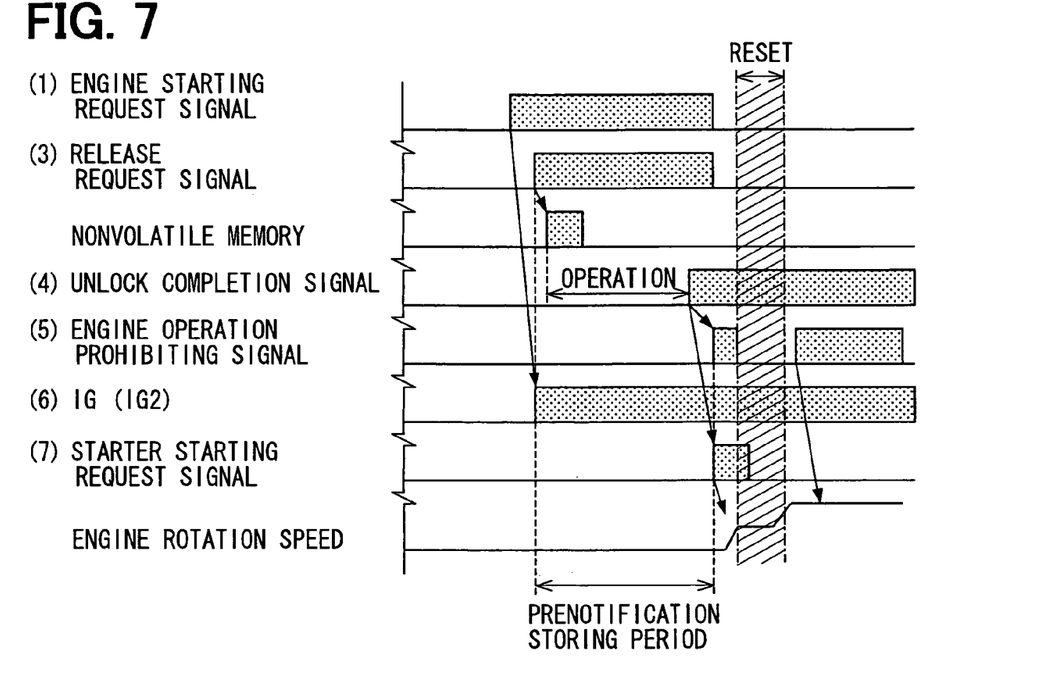
FIG. 7 is a timing chart showing a processing of the control routine according to the embodiment.

The EEPROM 5F (FIG. 3) serves as an engine operation prohibition releasing prenotifying information storing portion (prenotification storage portion). The prenotification storage portion stores prenotifying information of releasing the engine operation prohibition in a prenotification storing period shown in FIG. 7. The prenotification storing period starts from the timing, in which the device command means commands the specific device to move into the operatable condition until the control command means switches the engine operation prohibiting signal (5) to be in the prohibition releasing output condition. That is, the prenotification storing period is defined between the timing, in which the lock controller 10 receives the release request signal (3), and the timing, in which the engine operation prohibiting signal (5) is operated as shown in FIG. 7.

The immobilizer controller 5 and the engine controller 14 serve as an engine operation continuation control means (continuation control means). The continuation control means controls stop and continuous operation of the engine 16 in accordance with data stored in the prenotification storage portion 5F. Specifically, the continuation control means stops the engine 16 when the engine operation prohibiting signal (5) moves from the prohibition releasing output condition to the prohibition setting output condition after the starting control means starts the engine 16.

Programs of the above means are respectively stored in ROMs of the controllers 5, 10, 13, 14, for example.

The immobilizer controller 5 receives the verification ID from the wireless device 2 via the transmitter-receiver 6, so that the immobilizer controller 5 verifies the verification ID against the master ID registered in the vehicle 3. Specifically, the master ID is stored in a verification memory of the EEPROM 5F. When the two IDs coincide with each other, the immobilizer controller 5 operates a door lock motor 7 to unlock the door lock 8. By contrast, when the immobilizer controller 5 does not receive the verification ID from the wireless device 2 in a condition where the door lock is unlocked, the immobilizer controller 5 operates the door lock motor 7 to lock the door lock B. Therefore, when the driver approaches the vehicle 3, the door lock 8 is automatically unlocked, and when the driver departs from the vehicle 3, the door lock 8 is automatically locked. The master ID may be changed by calculation using random numerals or the like every time when the verification is performed. The verification ID of the wireless device 2 may be revised by wireless communication with the transmitter-receiver 6. Thus, security of the engine starting control system 1 can be enhanced.

A critical distance between the door lock and the wireless device for ID verification may be set equal to or greater than 10 cm and equal to or less than 1 m, for example. In this case, the wireless device 2 may often be located in the vehicle while being away from the transmitter-receiver 6 for a distance equal to or greater than the critical distance. In this case, when an immobilizer unset condition returns to an immobilizer set condition due to an unforeseen resetting, the processing from the ID verification cannot be redone for performing ID reverification. Therefore, the engine starting control system 1 uses a method, which do not need the ID reverification. Here, the immobilizer is unset in the immobilizer unset condition, and the immobilizer is set in the immobilizer unset condition.

Figure 4:
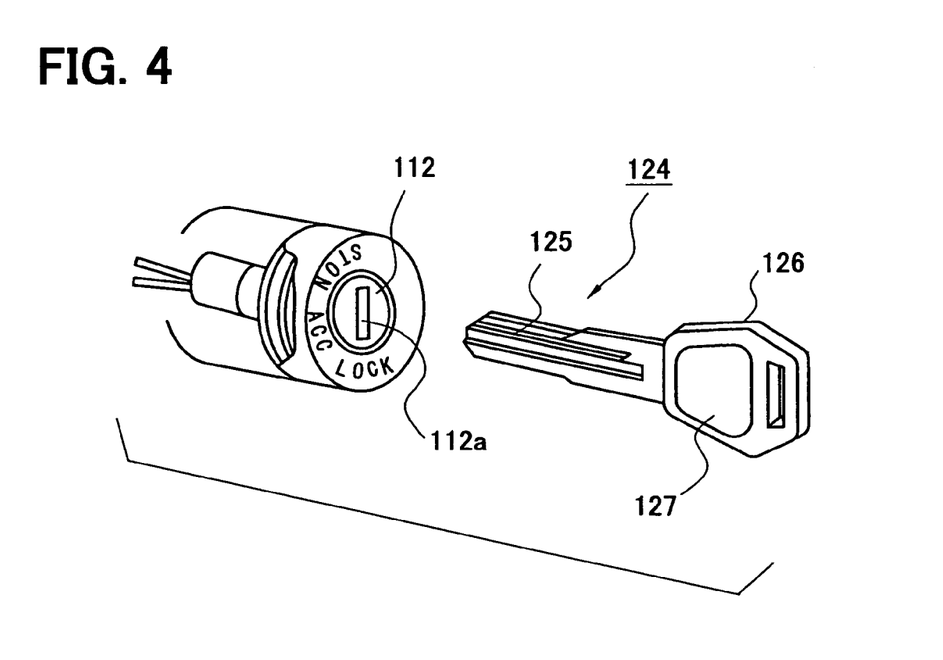
FIG. 4 is a perspective schematic view showing an example of a security key using a transponder according to an embodiment.
Figure 5:
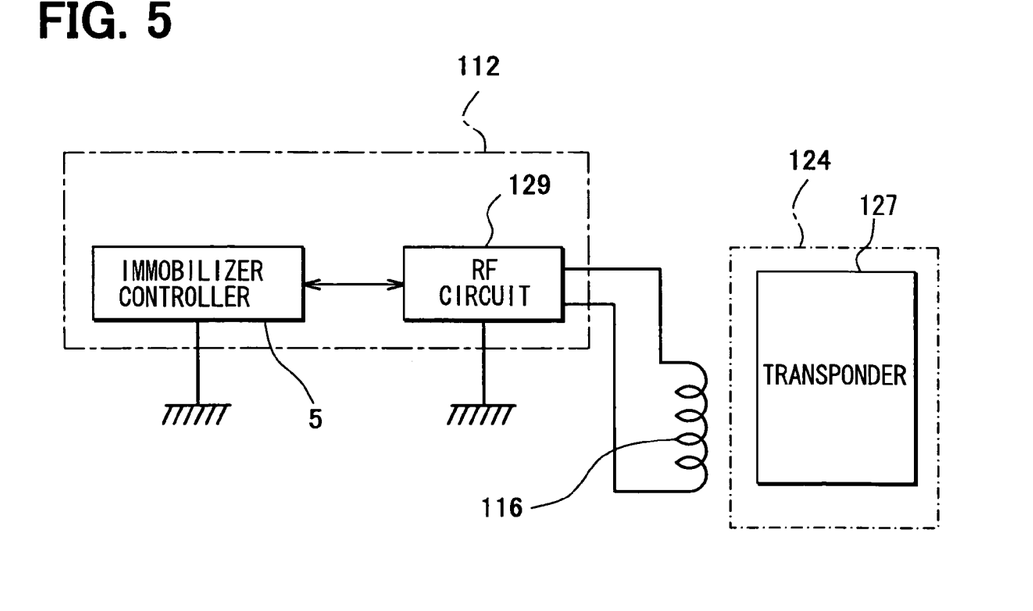
FIG. 5 is a schematic view showing a structure of a transmitter-receiver of the security key according to an embodiment.

The ID verification may be performed using a security key including a transponder, instead of the system using the wireless device 2. As shown in FIGS. 4, 5, the security key 124 includes an ignition key portion 125 and a handle portion 126. The handle portion 126 includes a transponder 127. The transponder 127 has a general structure, which may be constructed of a semiconductor, an antenna, and the like. The semiconductor of the transponder 127 may include a memory and the like integrated to be a single chip. When the transponder 127 receives radiowave (inquiry radiowave) for inquiry, the transponder 127 transmits information stored in the memory via radiowave (answer radiowave), which is generated by energy of the inquiry radiowave. The security key 124 is inserted into a keyhole 124a formed in the key cylinder 112 to unlock the steering lock and to ignite the engine. As shown in FIG. 5, the transmitter-receiver 6 on the side of the vehicle is constructed of an RF circuit 129 and a transmitter-receiver coil 116. The transmitter-receiver 6 is accommodated in the key cylinder 112. The RF circuit 129 operates the transmitter-receiver coil 116 at high frequency for a predetermined period to magnetize the transmitter-receiver coil 116 of the transponder 127, so that the RF circuit 129 performs frequency modulation with respect to the verification ID transmitted from the immobilizer controller 5. The RF circuit 129 transmits the frequency-modulated verification ID to the transponder 127 via the transmitter-receiver coil 116. Furthermore, the RF circuit 129 receives the verification ID transmitted from the transponder 127 via the transmitter-receiver coil 116, and demodulates this verification ID, subsequently; the RF circuit 129 transmits the demodulated verification ID.

Figure 6:
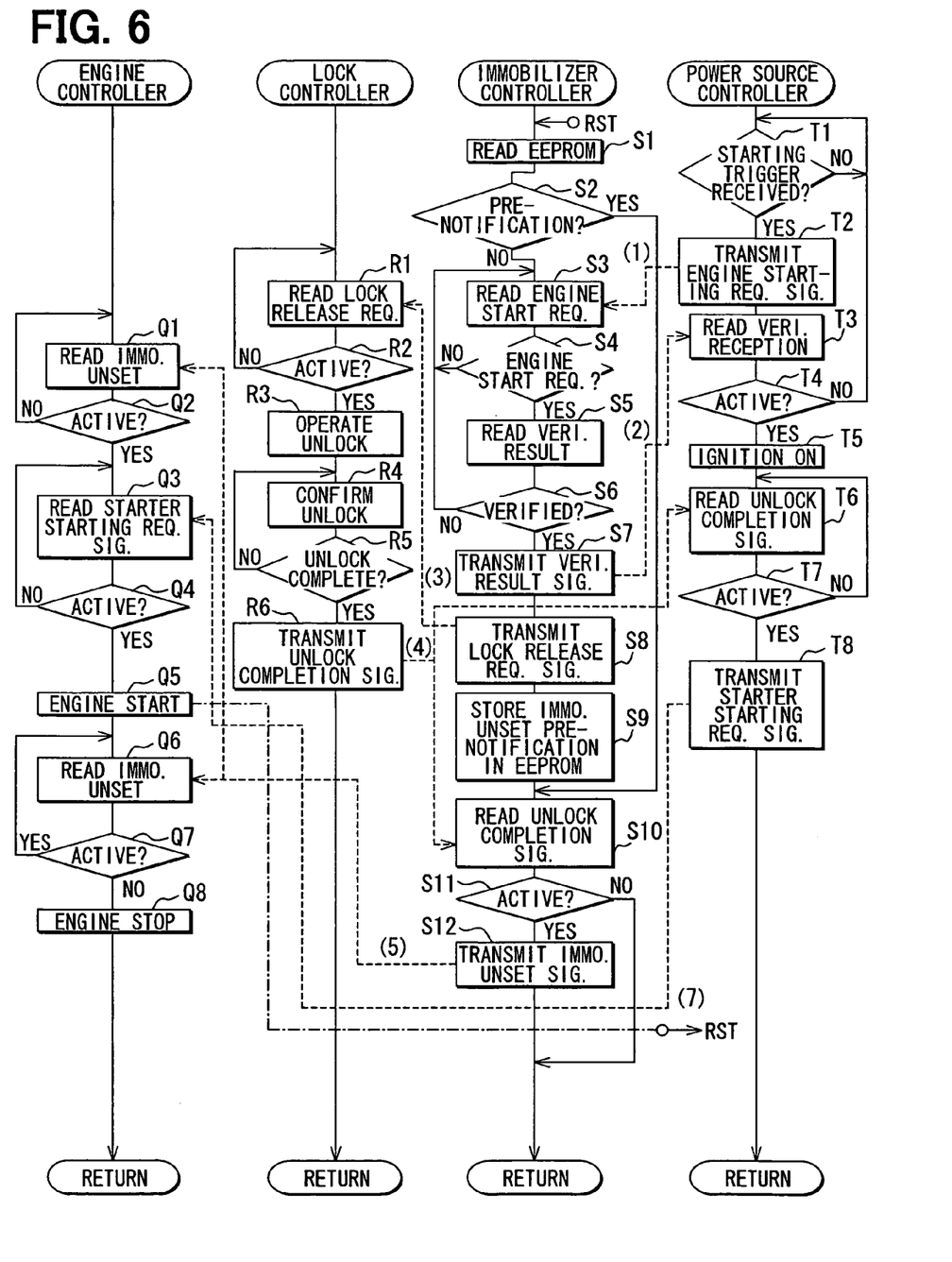
FIG. 6 is a flowchart showing a control routine executed in the engine starting control system according to the embodiment.

Next, an operation of the engine starting control system 1 is described in reference to FIGS. 6, 7. Signals in the following description are level signals, in general. A term of signal transmission is used to specify setting a level of a signal port on the side of the transmitter active. In this signal transmission, a receiver connects with a corresponding signal port on the side of the transmitter to read a signal from the corresponding signal port. When the corresponding signal port is active, the receiver receives the signal.

The vehicle 3 has a one-push engine starting system that can start and stop the engine 16 by operating a push button switch, for example. An operation switch (engine starting switch) 21 is provided to the vehicle 3. The engine starting switch 21 may be provided to the wireless device 2. In steps T1, T2, when the engine starting switch is operated, a starting trigger is transmitted to the power source controller 13, so that the power source controller 13 transmits an engine starting request signal (1).

In step S1, the immobilizer controller 5 reads the EEPROM 5F (FIG. 3) in an initial processing. The immobilizer controller 5 evaluates whether the prenotifying information (pre notification) is stored in the EEPROM 5F in step S2. When the prenotifying information is not stored in the EEPROM 5F, the immobilizer controller 5 receives the engine starting request signal (1) in steps S3, S4, and verifies the verification ID of the wireless device 2 against the master ID registered to the vehicle 3 in steps S5, S6. When the verification ID matches with the master ID, the verification is determined to be valid. That is, the verification ID is authenticated, and the verification is accepted. In this condition, the verification is determined to be valid, and the immobilizer controller 5 transmits a verification result signal (2) to the power source controller 13 in step S7. The immobilizer controller 5 transmits a lock release request signal (release request signal 3) to the rock controller 10 in step S8. The lock controller 10 receives the release request signal (3) in steps R1, R2, so that the lock controller 10 operates the steering lock motor 11 to unlock the steering lock 12 in step R3. When the lock controller 10 completes confirmation of unlocking the steering lock 12 in steps R4, R5, the lock controller 10 transmits an unlock completion signal (4) to the immobilizer controller 5 and the power source controller 13 in step R6. The power source controller 13 receives the verification result signal (2) indicating acceptance of the ID verification, so that the power source controller 13 activates an ignition (6, not shown).

The immobilizer controller 5 receives the unlock completion signal (4) in steps S10, S11, so that the immobilizer controller 5 unsets the immobilizer. Specifically, a prohibiting signal, which prohibits engine starting, is deactivated to be in a prohibition release output condition, so that the immobilizer 5 is unset. Here, the prohibiting signal is activated to be in a prohibition setting output condition, so that the immobilizer is set. The power source controller 13 also receives the unlock completion signal (4) in steps T6, T7, so that the power source controller 13 transmits a starter starting request signal (7).

The engine controller 14 monitors the prohibiting signal in an initial condition. The engine controller 14 is in a waiting condition in steps Q1, Q2 before the immobilizer is unset to be in the prohibition release output condition. When the immobilizer is unset, the engine controller 14 reads the starter starting request signal (7) in steps Q3, Q4. When the starter starting request signal (7) is active, the engine controller 14 determines a condition for engine stating to be satisfied, so that engine controller 14 starts the engine in step Q5. After starting the engine, the engine controller 14 continues monitoring whether the immobilizer is maintained in the immobilizer unset condition.

When the immobilizer unset condition is reset, the engine may be stopped. This reset may be caused by engine starting. Specifically, the reset signal RST in FIG. 3 is an edge trigger signal generated by applying specific reset voltage. Specific reading/writing voltage is applied for reading data from the RAM 5C and for writing data to the RAM 5C. The specific reading/writing voltage is applied for reading data from the ROM 5B and the EEPROM 5F. The reset voltage of the reset signal RST is substantially the same as the reading/writing voltage for accessing the RAM and ROMs. Accordingly, the falling edge of the voltage may be erroneously recognized as a reset trigger.

Specifically, the battery is used as the power source of signals. Therefore, the power source voltage of the reset signal is the same as battery voltage, which is applied bypassing a regulator. For example, when the starter rotates in cranking during engine stating, load applied to the battery may quickly increase. In this case, battery voltage may fall due to quick increase in the load. As a result, the fall in battery voltage may be erroneously recognized as a reset trigger.

In the processing shown in FIG. 6, the following three conditions need to be satisfied to enable both engine starting and continuously operating the engine. The three conditions include the acceptance of ID verification in steps S5 to T3, the completion of unlocking the steering lock in steps R6 to S10 and T6, and the immobilizer unsetting in steps S12 to Q1 and Q6. When information of immobilizer set is read in step Q6, the engine is stopped in step Q8, even the resetting is caused by engine starting. As a result, the engine cannot be smoothly started.

Therefore, the immobilizer controller 5 stores the prenotifying information of the immobilizer unset condition, in which engine operation prohibition is released, in the EEPROM 5F in step S9 in the prenotification storing period shown in FIG. 7. Thus, the immobilizer controller 5 restricts the engine from irregularly stopping. This prenotification storing period shown in FIG. 7 is a period subsequent to commanding the steering lock (specific vehicular operating device) to transit into the unlock condition (operatable condition), and in advance of transition to the immobilizer unset condition. When the immobilizer is unset, the prohibiting signal becomes in the prohibition release output condition. That is, the prenotification storing period shown in FIG. 7 is subsequent to step S8 and is in advance of step S12. Voltage for reading/writing signal of the EEPROM 5F is controlled at a level higher than the voltage of the reset signal. Therefore, data stored in the EEPROM 5F can be conserved even when the immobilizer controller 5 receives the reset signal RST.

In the case where an irregular resetting occurs after storing the immobilizer unset prenotifying information, the processing is initialized, and the routine returns to step S1, in which the immobilizer controller 5 reads the EEPROM 5F. When the immobilizer reads the immobilizer unset prenotifying information stored in the EEPROM 5F in step S2, the immobilizer controller 5 determines the irregular resetting to be invalid. Subsequently, the routine proceeds to step S12, in which the immobilizer controller 5 switches the immobilizer set condition to the immobilizer unset condition, so that the immobilizer controller 5 corrects the irregular resetting condition. Thus, the engine controller 14 can read the immobilizer unset signal in step Q6, so that the engine controller 14 can continue engine operation. In this condition, when the unlock completion signal is not active in steps S10, S11 due to a certain reason, the immobilizer should be set. Therefore, in this case, step S12 is skipped. The inactivity of the unlock completion signal is caused by the certain reason, which may be malfunction of the steering lock that causes returning to the unlock condition. Alternatively, the certain reason may be incapability of unlocking from an initial condition, for example.

The stored information is erased when the engine is stopped for a second time to be in the immobilizer set condition after starting the engine.

Figure 8:
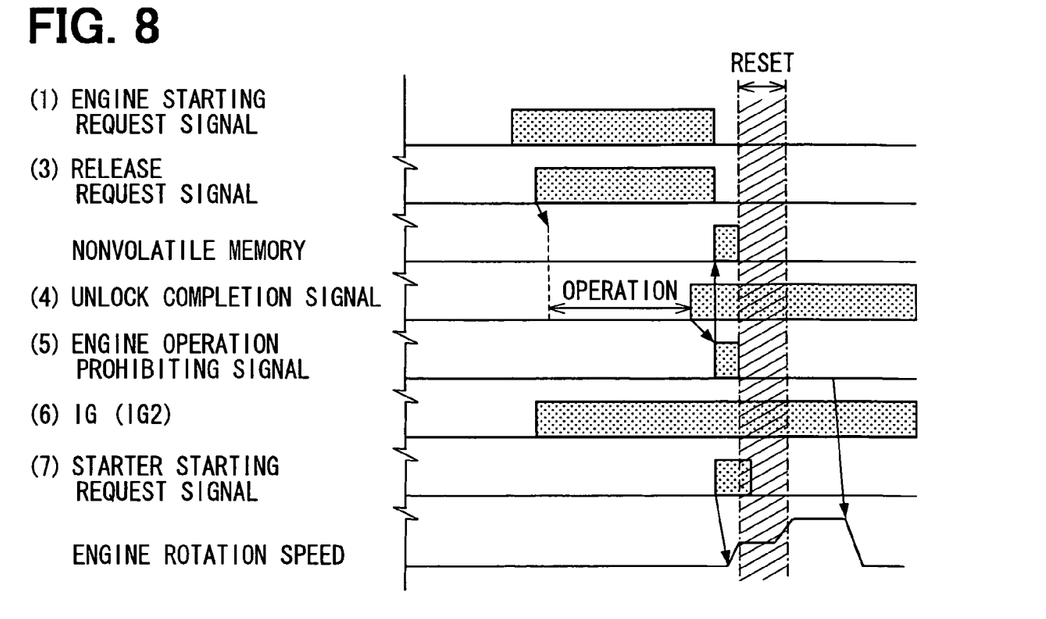
FIG. 8 is a timing chart showing an example of a processing of the control routine according to the embodiment.

It is conceivable to perform data back up against the irregular resetting such that a condition of unsetting the immobilizer is stored in the EEPROM 5F immediately after completion of the unsetting the immobilizer, for example. However, in this case, as shown in FIG. 8, an interval from the timing of unsetting the immobilizer to the timing of the engine starting is considerably short. Accordingly, when the irregular resetting is caused due to engine starting, it is difficult to secure a period for writing information of the immobilizer unsetting in the EEPROM 5F. As a result, this writing of the information may fail.

However, in this embodiment, immobilizer unsetting is not backed up as an accomplished fact. As referred to FIG. 7, the immobilizer unset prenotifying information is stored in the EEPROM 5F after commanding unlocking of the steering lock in this embodiment. As referred to FIG. 2, the steering lock has a mechanical lock structure. Therefore, when the lock condition transits to the unlock condition, a delay arises, and this delay is much longer than an interval from unsetting the immobilizer to engine starting. Therefore, a sufficient period can be secured for writing the immobilizer unset prenotifying information in the EEPROM 5F, so that failure can be restricted from arising in wiring the immobilizer unset prenotifying information. Therefore, the immobilizer unset prenotifying information can be steadily stored in the EEPROM 5F without being interrupted due to resetting caused by engine starting, for example. Thus, the engine operation can be maintained in accordance with the immobilizer unset prenotifying information, even when the immobilizer unset condition is accidentally reset.

As described above, in this embodiment, the engine starting control system serves as the immobilizer for protecting the vehicle from being stolen. In general, the immobilizer performs the operation to restrict or prohibit operating the specific device needed for driving the vehicle, in addition to the engine start prohibition setting operation. The engine start prohibition setting operation directly prohibits engine starting when the ID verification is rejected, so that security is enhanced. In this condition, the immobilizer is set. Specifically, the specific device is the steering lock. In addition, the specific device may be a shift lever and the door lock.

When the ID verification of the user is accepted, the setting (engine starting prohibition setting, immobilizer setting) of the immobilizer is released, so that the immobilizer is unset. Thus, engine starting can be performed. However, unsetting the immobilizer (immobilizer unsetting) needed for engine starting may be reset due to cranking or the like during the engine starting. In this case, it is conceivable to immediately perform the data backup of this immobilizer unset condition in a back up memory, after unsetting the immobilizer. However, when a processing from the immobilizer unsetting to the engine starting is quickly proceeded, the data backup cannot be performed before the unforeseen immobilizer unsetting.

The immobilizer unsetting is deeply associated with enabling operation (operating prohibition release) of the specific device in a releasing sequence of the immobilizer operation. Therefore, a timing to perform the data backup of the immobilizer unsetting is important. In this embodiment, the operating prohibition release of the specific device is performed in advance of the immobilizer unsetting. Specifically, the control command means switches the engine operation prohibiting signal to be in the prohibition releasing output condition after transiting the specific device to be in an operatable condition. Thus, a regular interval exists after operating the prohibition release of the specific device and before the unsetting immobilizer.

In this embodiment, the engine start control system has the prenotification storage portion. The prenotification storage portion stores prenotifying information of releasing of the engine operation prohibition (immobilizer unsetting) in the interval (prenotification storing period shown in FIG. 7). This interval starts after the specific device command means commands the device control means to transit to the operatable condition, and continues until the control command means switches the engine operation prohibiting signal to a prohibition releasing output condition. The specific device is released from the operation prohibiting condition on the premise of acceptance of the ID verification. Therefore, it is guaranteed that the immobilizer unsetting is certainly performed in the interval by releasing the operation prohibiting, even the immobilizer unsetting is not actually performed. Accordingly, the prenotifying information serves as a backup data of the immobilizer unsetting, by which the engine operation prohibiting signal is set in the prohibition releasing output condition. The continuation control means controls stop and continuous operation of the engine in accordance with the data stored in the prenotification storage portion when the engine operation prohibiting signal transits from the prohibition releasing output condition to the prohibition setting output condition, after the starting control means starts the engine.

The prenotifying information is obtained in the period, which is the interval, i.e., the prenotification storing period before the immobilizer is unset.

In the method of this embodiment, a sufficient period can be produced before cranking operation applies heavy load against the battery by engine starting, compared with a method, which entirely performs data backup of the immobilizer unsetting. Therefore, the prenotifying information can be stored in the prenotification storage portion without being interrupted by resetting caused by engine starting, for example. Thus, even when the immobilizer unsetting is accidentally reset, an engine operation can be continued in accordance with the prenotifying information. As a result, a false operation is not be apt to occur even when the immobilizer is improperly reset due to cranking or the like during engine starting, so that engine starting can be smoothly performed on a steady basis.

It is one of objects of this embodiment to complete the data backup of the immobilizer unsetting for restricting the engine from stopping even when the immobilizer is reset after starting the engine. Therefore, preferably, the ID reverification, which takes long, is not performed. That is, the user ID verifying means preferably do not perform reverification of the user ID when the continuation control means continues the engine operation based on the prenotification. However, another exclusive CPU may be added to the engine starting control system. Specifically, the exclusive CPU can perform reverification of the user ID to confirm the ID verification in a parallel manner while continuing engine starting. In this case, when the reverification of the user ID is rejected, the engine can be stopped, for example.

The security key may be the wireless communication portable device that performs the ID verification by transmitting and receiving data with the communication device of the vehicle in a wireless manner within the communication range. The communication range is within a critical distance equal to or greater than 10 cm and is equal to or less than 1 m, for example. When the portable device is put in the vehicle to be away from the communication device of the vehicle for more than the critical distance, the portable device cannot retry the ID verification. Therefore, when the engine operation is continued based on the prenotification, it is significantly effective that the user ID verifying means does not perform the reverification of the user ID.

The specific device may be a steering portion such as the steering shaft of the vehicle, and the device control means locks and unlocks the steering portion using the steering lock mechanism to switch the steering portion between the operatable condition and the non-operatable condition. The immobilizer and the steering lock mechanism are concomitantly used, so that security performance can be further enhanced against theft. The immobilizer is preferably unset after completion of unlocking the steering shaft. The steering lock mechanism has the mechanism structure, so that the interval before the unlocking is actually performed after the unlocking is commanded for transiting to the operatable condition is sufficiently long. Therefore, a period for storing the prenotifying information can be sufficiently secured. Particularly, the EEPROM has a large number of writing steps. Therefore, it is effective to secure the sufficient period.

The operation prohibiting means can reset the engine operation prohibiting signal to the prohibition setting output condition (immobilizer setting) by externally receiving the reset signal.

When the immobilizer is reset, the immobilizer set condition is defined to be a default condition, so that the engine is restricted from accidentally starting. However, as described above, when the irregular resetting is caused by cranking in the engine starting for example, the immobilizer unset condition, which is set based on acceptance of the ID verification, may return to the immobilizer set condition. In this case, the prenotification storage portion is preferably constructed of the non-volatile memory, which is electrically rewritable and is capable of storing the prenotifying information, even when the external reset signal is input. The non-volatile memory is preferably constructed of the electrically erasable programmable read only memory (EEPROM) in consideration of a reading and writing performance. The non-volatile memory may be a disc device. However, the EEPROM is more excellent in cost, reliability, and the reading and writing performance compared with the disc device.

The continuation control means may continue the engine operation unconditionally when the prenotification storage portion stores the prenotifying information. However, the immobilizer unset condition, which is once set, may be returned to the immobilizer set condition by a command from another security routine due to a proper reason. In this situation, when the prenotifying information stored in the prenotification storage portion is not revised, the immobilizer unset condition cannot be properly changed to the immobilizer set condition. To solve this problem, continuation of the engine operation may be evaluated by recognizing a condition of the specific device in addition to processings of the immobilizer setting and the immobilizer unsetting. Specifically, the processings of the immobilizer set/immobilizer unset are paired with prohibition/allowance of the specific device. In this case, specifically, the continuation control means continues engine operation, when the prenotification is stored in the prenotification storage portion and the specific device is operatable.

In this structure, when the continuation control means confirms both the prenotifying information and the condition of the engine operation prohibiting signal, two systems of signals information are needed to evaluate continuation of the engine operation. As a result, the algorithm of the evaluation may be complicated.

Therefore, the continuation control means may include a prohibition releasing output condition restoring means (prohibition restoring means). Specifically, when the prenotification storage portion stores the prenotifying information, the prohibition restoring means restores the engine operation prohibiting signal, which is moved to the prohibition setting output condition, to the prohibition releasing output condition. The continuation control means continues the engine operation only when the engine operation prohibiting signal is in the prohibition releasing output condition. In this structure, the continuation control means can operate the continuation of the engine operation in a united way by the engine operation prohibiting signal.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A control system for starting an engine, the control system comprising:
   a user ID verifying means that verifies a user ID stored in a security key of a user;
   a device control means that switches a specific device to be one of operatable and non-operatable;
   a device command means that transmits a lock releasing signal to the device control means to set the specific device operatable when the user ID verifying means authenticates the user ID;
   an operation prohibiting means that outputs an operation prohibiting signal, which can be switched between a prohibition setting condition and a prohibition releasing condition;
   a control command means that switches the operation prohibiting signal to be in the prohibition releasing condition after the specific device changes to be operatable;
   a starting control means that starts the engine when the operation prohibiting signal is in the prohibition releasing condition, the starting control means prohibiting the engine from starting when the operation prohibiting signal is in the prohibition selling condition;
   a prenotification storage portion that stores prenotifying information of releasing prohibition of the engine operation in an interval, wherein the interval is subsequent to that the device command means commands the specific device to be operatable, and the interval is in advance of that The control command means switches the operation prohibiting signal to be in the prohibition releasing condition; and a continuation control means that controls stopping the engine and continuing the engine operation in accordance with information stored in the prenotification storage portion when the operation prohibiting signal changes from the prohibition releasing condition to be in the prohibition selling condition after the starting control means starts the engine, wherein the prenotifying information is an indication that the device command means has transmitted the lock releasing signal to the device control means to set the specific device operatable.

2. A control system for starting an engine, the control system comprising:

a user ID verifying means that verifies a user ID stored in a security key of a user;

a device control means that switches a specific device to be one of operatable and non-operatable;

a device command means that transmits a lock releasing signal to the device control means to set the specific device operatable when the user ID verifying means authenticates the user ID;

an operation prohibiting means that outputs an operation prohibiting signal, which can be switched between a prohibition selling condition and a prohibition releasing condition;

a control command means that switches the operation prohibiting signal to be in the prohibition releasing condition after the specific device changes to be operatable;

a starting control means that starts the engine when the operation prohibiting signal is in the prohibition releasing condition, the starting control means prohibiting the engine from starting when the operation prohibiting signal is in the prohibition selling condition;

a prenotification storage portion that stores prenotifying information of releasing prohibition of the engine operation in an interval, wherein the interval is subsequent to that the device command means commands the specific device to be operatable, and the interval is in advance of that the control command means switches the operation prohibiting signal to be in the prohibition releasing condition; and a continuation control means that controls stopping the engine and continuing the engine operation in accordance with information stored in the prenotification storage portion when the operation prohibiting signal changes from the prohibition releasing condition to be in the prohibition selling condition after the starting control means starts the engine, wherein the prenotifying information is an indication that the command control means will switch the operation prohibiting signal from the prohibition selling condition in which engine operation is prohibited to the prohibition releasing condition in which engine operation is allowed.

3. The control system according to claim 2, wherein an engine operation is prohibited in the prohibition selling condition, and the engine operation is allowed in the prohibition releasing condition.

4. The control system according to claim 2, wherein the user ID verifying means skips reverification of the user ID when the continuation control means continues the engine operation in accordance with the prenotifying information.

5. The control system according to claim 2, wherein the specific device is a device needed for driving the vehicle by the user.

6. The control system according to claim 5, wherein the specific device is a steering portion of the vehicle, and the device control means locks and unlocks a steering shaft using a steering lock mechanism to switch the steering portion to be one of operatable and non-operatable.

7. The control system according to claim 2, wherein the operation prohibiting means resets the operation prohibiting signal to be in the prohibition releasing condition by receiving a reset signal from an outside, and the prenotification storage portion includes a non-volatile memory that stores information, which is electrically rewritable, and the non-volatile memory maintains the information even when the prenotification storage portion receives the reset signal from the outside.

8. The control system according to claim 7, wherein the non-volatile memory is constructed of an EEPROM.

9. The control system according to claim 2, wherein the prenotification storage portion stores the prenotifying information, and the continuation control means continues the engine operation when the specific device is operatable.

10. The control system according to claim 9, wherein the continuation control means includes a prohibition restoring means, the prohibition restoring means restores the operation prohibiting signal from the prohibition setting condition to the prohibition releasing condition when the prenotification storage portion stores the prenotifying information, and the continuation control means continues the engine operation only when the operation prohibiting signal is in the prohibition releasing condition.

11. The control system according to claim 2, wherein the security key is a portable device taken by the user.

12. The control system according to claim 2, wherein the specific device is at least one of a steering lock, a shift lever, and a door lock of a vehicle.

13. A control system for starting an engine, the control system comprising:

an immobilizer controller configured to verify a user ID stored in a security key of a user;

a lock controller that switches a specific device to be one of operable and non-operable;

a power source controller that transmits a lock releasing signal to the lock controller to set the specific device operable when the immobilizer controller verifies the user ID;

wherein the immobilizer controller is further configured to output an operation prohibiting signal, which can be switched between a prohibition setting condition in which engine operation is prohibited and a prohibition releasing condition in which engine operation is allowed;

wherein the immobilizer controller is further configured to switch the operation prohibiting signal to be in the prohibition releasing condition after the specific device has been switched to be operable;

an engine controller configured to start the engine when the operation prohibiting signal is in the prohibition releasing condition and to prohibit the engine from starting when the operation prohibiting signal is in the prohibition setting condition;

a prenotification storage portion that stores prenotifying information of releasing prohibition of the engine operation in an interval subsequent to the power source controller setting the specific device to be operable and before the immobilizer controller switches the operation prohibiting signal to be in the prohibition releasing condition; and a continuation control means that controls stooping the engine and continuing the engine operation in accordance with information stored in the prenotification storage portion when the operation prohibiting signal changes from the prohibition releasing condition to be in the prohibition setting condition after the engine controller starts the engine, wherein the prenotifying information is an indication that the immobilizer controller will switch the operation prohibiting signal from the prohibition setting condition in which engine operation is prohibited to the prohibition releasing condition in which engine operation is allowed.

14. The control system according to claim 13, wherein the interval is further between a first timing at which the lock controller receives a release request signal from the immobilizer controller and a second timing at which the engine operation prohibiting signal is switched from the prohibition setting condition in which engine operation is prohibited to the prohibition releasing condition in which engine operation is allowed.

15. A control system for starting an engine, the control system comprising:

an immobilizer controller configured to verify a user ID stored in a security key of a user;

a lock controller that switches a specific device to be one of operable and non-operable;

a power source controller that transmits a lock releasing signal to the lock controller to set the specific device operable when the immobilizer controller verifies the user ID;

wherein the immobilizer controller is further configured to output an operation prohibiting signal, which can be switched between a prohibition setting condition in which engine operation is prohibited and a prohibition releasing condition in which engine operation is allowed;

wherein the immobilizer controller is further configured to switch the operation prohibiting signal to be in the prohibition releasing condition after the specific device has been switched to be operable;

an engine controller configured to start the engine when the operation prohibiting signal is in the prohibition releasing condition and to prohibit the engine from starting when the operation prohibiting signal is in the prohibition setting condition;

a prenotification storage portion that stores prenotifying information of releasing prohibition of the engine operation in an interval subsequent to the power source controller setting the specific device to be operable and before the immobilizer controller switches the operation prohibiting signal to be in the prohibition releasing condition; and a continuation control means that controls stopping the engine and continuing the engine operation in accordance with information stored in the prenotification storage portion when the operation prohibiting signal changes from the prohibition releasing condition to be in the prohibition setting condition after the engine controller starts the engine, wherein the prenotifying information is an indication that the power source controller has transmitted the lock releasing signal to the lock controller to set the specific device operable.

* * * * *